US012606664B2

(12) United States Patent
Kiziltas et al.

(10) Patent No.: US 12,606,664 B2
(45) Date of Patent: Apr. 21, 2026

(54) POLYURETHANE FOAM WITH GRAPHITE FILLERS RECOVERED FROM SPENT LITHIUM-ION BATTERIES

(71) Applicant: Ford Global Technologies, LLC, Dearborn, MI (US)

(72) Inventors: Alper Kiziltas, Sarikamis (TR); Sandeep Tamrakar, Ann Arbor, MI (US); Bhaskara Rao Boddakayala, Troy, MI (US); Deborah Frances Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 18/178,068

(22) Filed: Mar. 3, 2023

(65) Prior Publication Data

US 2024/0294696 A1 Sep. 5, 2024

(51) Int. Cl.
| | |
|---|---|
| *C08J 9/00* | (2006.01) |
| *C08G 18/08* | (2006.01) |
| *C08G 18/12* | (2006.01) |
| *C08K 3/04* | (2006.01) |
| *C08G 101/00* | (2006.01) |

(52) U.S. Cl.
CPC ............. *C08G 18/14* (2013.01); *C08G 18/12* (2013.01); *C08J 9/0066* (2013.01); *C08K 3/04* (2013.01); *C08G 2101/00* (2013.01); *C08J 2375/04* (2013.01)

(58) Field of Classification Search
CPC .... C08G 18/14; C08G 18/12; C08G 2101/00; C08G 2110/0008; C08G 2110/0025; C08G 18/72; C08J 9/0066; C08J 2375/04; C08K 3/04; C08L 75/04; Y02E 60/10
See application file for complete search history.

(56) References Cited

U.S. PATENT DOCUMENTS

| | | | |
|---|---|---|---|
| 8,143,323 B2 | 3/2012 | Iwase | |
| 9,868,835 B1 | 1/2018 | Kiziltas et al. | |
| 11,273,453 B2 | 3/2022 | Kochhar et al. | |
| 2018/0319926 A1 | 11/2018 | Fregni et al. | |

OTHER PUBLICATIONS

Rey et al., Environmental Impacts of Graphite Recycling from Spent Lithium-Ion Batteries Based on Life Cycle Assessment, ACS Sustainable Chemistry & Engineering, 2021, pp. 14488-14501, vol. 9, ACS Publications.

*Primary Examiner* — K. Boyle
(74) *Attorney, Agent, or Firm* — Burris Law, PLLC

(57) ABSTRACT

A foam material includes the reaction product of a polyol mixture and an isocyanate mixture and a graphite filler obtained from spent lithium-ion batteries. The graphite filler defines a layered structure and adhesion anchor points.

20 Claims, 5 Drawing Sheets

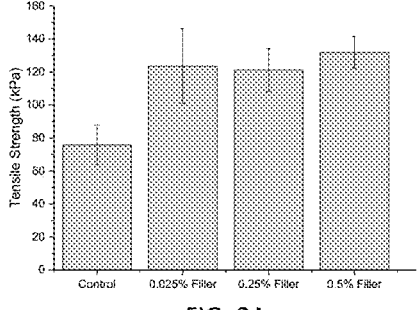
FIG. 2A
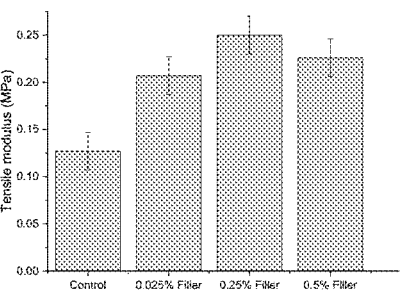
FIG. 2B
FIG. 2C
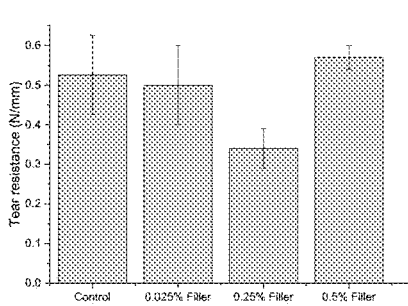
FIG. 2D

POLYURETHANE FOAM WITH GRAPHITE FILLERS RECOVERED FROM SPENT LITHIUM-ION BATTERIES

FIELD

The present disclosure relates to polyurethane foams, and more particularly to polyurethane foams including structural fillers.

BACKGROUND

The statements in this section merely provide background information related to the present disclosure and may not constitute prior art.

Incorporating additives and structural fillers into polyurethane foams can provide improved mechanical, thermal, and electrical properties to create higher performance components made from such foams and can provide improved Noise Vibration Harshness (NVH) properties. There is a countervailing desire, however, to mitigate the weight of such foams.

Conventional methods for manufacturing polyurethane foams typically include reacting a mixture with at least one polyol with hydroxyl groups (such as petroleum-based polyols and also referred to herein as a polyol-containing composition or polyol mixture) with at least one diisocyanate and/or polyisocyanate (also referred to herein as an isocyanate or isocyanate mixture). Additives may also be included, such as blowing agents, surfactants, and catalysts, among others. The mixture of the polyol mixture, the isocyanate mixture, and any additives is also referred to as a reaction mixture or a reaction product. The polyol mixture can include additives, and a gas is formed as a result of the blowing agent, which is typically water, reacting with the isocyanates, thereby forming carbon dioxide and polyurea linkages. Other additives enhance the properties of the resulting foam, control the aforementioned reactions, and the like.

Such foams are used in a variety of automotive applications, as they can form lightweight, flexible, high-resilience, and rigid foams.

These issues related to the design and manufacture of foams having graphite additives from spent lithium-ion batteries, particularly in automotive applications, are addressed by the present disclosure.

SUMMARY

This section provides a general summary of the disclosure and is not a comprehensive disclosure of its full scope or all of its features.

According to one form of the present disclosure, a foam material includes the reaction product of a polyol mixture and an isocyanate mixture and a graphite recovered from a lithium-ion battery. The graphite defines a layered structure and adhesion anchor points.

In variations of this form, which may be implemented individually or in any combination: the graphite is at greater than or equal to about 0.025 wt. % to less than or equal to about 0.5 wt. %; the graphite has a purity greater than or equal to about 80%; the graphite has a purity of greater than or equal to about 95%; the graphite includes oxygen-containing groups in the form of defects; and a part is formed of the foam material.

According to a second form of the present disclosure, a foam material includes the reaction product of a polyol mixture and an isocyanate mixture and a graphite filler. The graphite filler is in an amount of greater than or equal to about 0.025 wt. % to less than or equal to about 0.5 wt. % and is recovered from a lithium-ion battery.

In variations of this form, which may be implemented individually or in any combination: the graphite filler defines a layered structure and adhesion anchor points; the graphite filler has a purity greater than or equal to about 80%; the graphite filler has a purity of greater than or equal to about 95%; the graphite includes oxygen-containing groups in the form of defects; the foam material has a tensile strength of greater than or equal to about 90 kPa; and the foam material has a tensile modulus of greater than or equal to about 0.15 MPa.

According to a third form of the present disclosure, a foam material includes the reaction product of a polyol mixture and an isocyanate mixture and a graphite filler in an amount of greater than or equal to about 0.025 wt. % to less than or equal to about 0.5 wt. %. The graphite filler defines a layered structure and adhesion anchor points.

In variations of this form, which may be implemented individually or in any combination: the graphite filler has a purity of greater than or equal to about 80%; the graphite filler a purity of greater than or equal to about 95%; the graphite filler includes oxygen-containing groups in the form of defects; the foam material has a tensile strength of greater than or equal to about 90 kPa; the foam material has a tensile modulus of greater than or equal to about 0.15 MPa; and a part is formed of the foam material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A is a graph showing the tensile strength of conventional polyurethane foams and polyurethane foams according to the present disclosure;

FIG. 2B is a graph showing the tensile modulus of conventional polyurethane foams and polyurethane foams according to the present disclosure;

FIG. 2C is a graph showing the extension at mass load of conventional polyurethane foams and polyurethane foams according to the present disclosure;

FIG. 2D is a graph showing the tear resistance of conventional polyurethane foams and polyurethane foams according to the present disclosure;

Figure 1A:
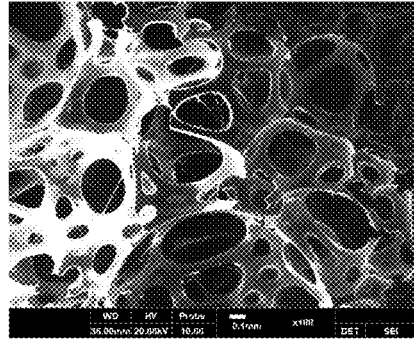
FIG. 1A is a scanning electron microscope image of a conventionally prepared foam prepared graphite recovered from a spent lithium-ion battery.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A polyurethane foam according to the present disclosure includes graphite recovered from spent lithium-ion batteries. As lithium-ion batteries undergo repeated charge cycles, the interlayer spaces of graphite are intercalated with lithium ions and the capacity of lithium-ion batteries diminishes (e.g., to about 30-40% of original capacity). Such lithium-ion batteries are also referred to herein as spent lithium-ion batteries. More specifically, during lithium-ion battery charge cycles, lithium ions transfer into and out of the anode and cathode. During this electrochemical reaction, the graphitic anode is lithiated and a transition metal oxide missing lithium is formed. Both the lithiated anode and transition metal oxide are reactive, and these transition materials can experience reactions with an electrolyte solution, which is typically organic based. The anode is particularly susceptible to such reactions, which results in a deposit forming over the anode, which can over time form a passivating film that inhibits further electrochemical reactions. Scanning electron microscope images of anodes of spent lithium-ion batteries that operated in an organic-based electrolyte solution show graphite having a solid electrolyte interphase, which is believed to reduce the capacity of lithium-ion batteries by limiting the sites at which lithium ions can intercalate. The resulting diminished capacity of such lithium-ion batteries suggests the structure of graphite is not fully recovered, resulting in a thinner and larger particle size distribution of graphite. Over time, this reduces lithium-ion battery capacity and eventually (e.g., after a duration of time or number of charge cycles), the lithium-ion battery is spent. That said, the inventors have discovered such graphite from spent lithium-ion batteries having sites that inhibit capacity can also serve as adhesion anchor points that can be used as additives in the formation of foam products having superior properties over foam products absent such graphite. Such graphite further defines a layered structure.

Figure 1B:
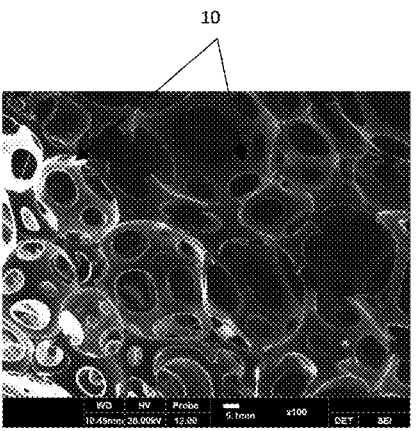
FIG. 1B is a scanning electron microscope image of a foam prepared according to a variation of the present disclosure.
Figure 1C:
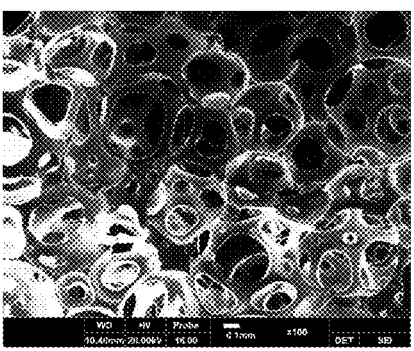
FIG. 1C is a scanning electron microscope image of a foam prepared according to another variation of the present disclosure.
Figure 1D:
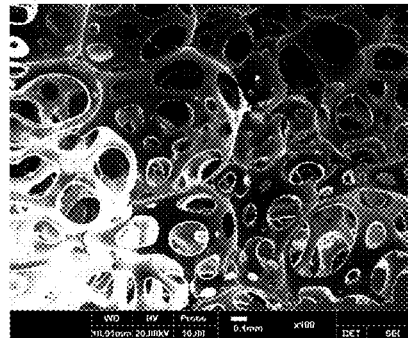
FIG. 1D is a scanning electron microscope image of a foam prepared according to yet another variation of the present disclosure.
Figure 3A:
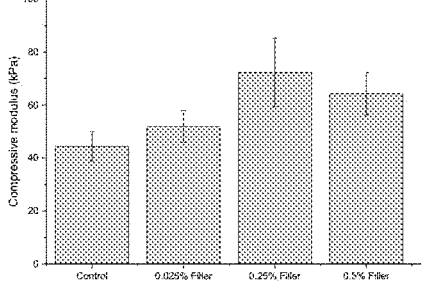
FIG. 3A is a graph showing the compressive modulus of conventional polyurethane foams and polyurethane foams according to the present disclosure.
Figure 3B:
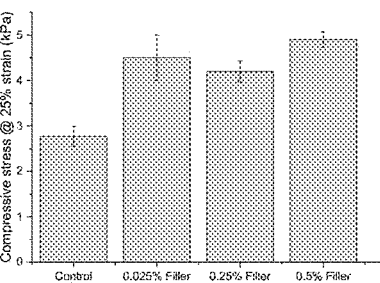
FIG. 3B is a graph showing the compressive stress at 25% strain in kPa of conventional polyurethane foams and polyurethane foams according to the present disclosure.
Figure 3C:
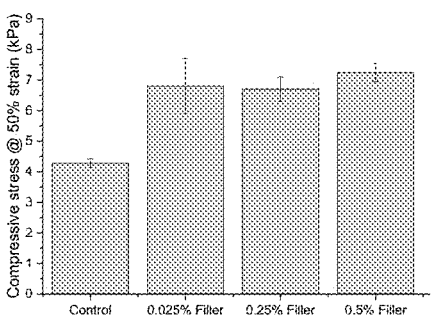
FIG. 3C is a graph showing the compressive stress at 50% strain in kPa of conventional polyurethane foams and polyurethane foams according to the present disclosure.
Figure 3D:
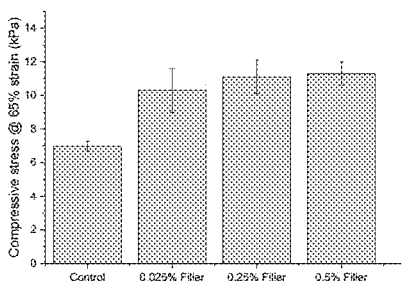
FIG. 3D is a graph showing the compressive stress at 65% strain in kPa of conventional polyurethane foams and polyurethane foams according to the present disclosure.

Referring to FIGS. 1A-1D, scanning electron microscope images of foam samples are shown. FIG. 1A shows a control foam, having no spent graphite added. FIGS. 1B-1D show foams having spent graphite concentrations of 0.025 wt. %, 0.25 wt. %, and 0.5 wt. % spent graphite, respectively. As illustrated in FIG. 1B, the foam includes adhesion anchor points 10, which are generally characterized as situses where there is cell size. Further, as can be seen in FIGS. 1A-1D, increasing the concentration of graphite recovered from 0 to 0.5 wt. % decreases the average cell size. The control foam, for example, showed average cell sizes of 202±100 μm, foam with 0.025 wt. % spent graphite showed average cell sizes of 172±84 μm, foam with 0.25 wt. % spent graphite showed average cell sizes of 162±86 μm, and foam with 0.5 wt. % spent graphite showed average cell sizes of 138±84 μm. It was also observed that adding spent graphite resulted in a less uniform foam structure. The improved mechanical properties, as discussed in greater detail herein, may be explained by the interfacial adhesion which was between porous foam and spent graphite fillers that lodge in the cellular structure of the foam matrix.

As used herein, "isocyanates" include diisocyanates such as aromatic diisocyanates, toluene diisocyanates ("TDI"), and methylene diphenyl diisocyanates ("MDI"), as well as polyisocyanates, and mixtures thereof. Non-limiting examples of isocyanates include methylene diphenyl diisocyanate (MDI), toluene diisocyanate (TDI), hexamethylene diisocyanate (HDI), isophorone diisocyanate (IPDI), 4,4'-diisocyanatodicyclohexylmethane (H12MDI), 1,5-naphthalenediisocyanate (NDI), tetramethyllxylenediisocyanate (TMXDI), p-phenylenediisocyanate (PPDI), 1,4-cyclohexane diisocyanate (CDI), tolidine diisocyanate (TODI), and combinations thereof. It is contemplated isocyanates may include polymeric materials.

Polyol-containing compositions, or polyol mixtures according to the present disclosure include at least one of petroleum-based polyols, bio-based polyols, and $CO_2$-polyols, as well as mixtures thereof (e.g., 100% petroleum-based, 80% petroleum-based and 20% bio-based, or other mixtures not specifically listed here).

As used herein, "petroleum-based polyols" (hereafter "petro-polyol") include polyether polyols by way of not-limiting example, which can be used in the practice of the present disclosure and are well known and widely available commercially. Such polyols are generally at least about 80% by weight or more of a composition or blend of compositions directly or indirectly obtained from a non-renewable resource such as crude oil. In other variations, the polyols are generally at least about 85% by weight, at least 90% by weight, and/or at least 95% by weight or more of a composition or blend of compositions directly or indirectly obtained from a non-renewable resource such as crude oil. Non-limiting examples of the polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and random and block copolymer glycols prepared from blends or sequential addition of two or more alkylene oxides. The mechanical properties of the resultant polyurethane foam may dictate the consistency of the polyol. More specifically, higher molecular weight polyols generally form more flexible polyurethanes, whereas lower molecular weight polyols generally form more rigid polyurethanes.

As used herein, "bio-based polyols" refer to polyols generally at least about 80% by weigh or more of a composition or blend of compositions directly or indirectly obtained from a natural oil. In other embodiments, the polyols are generally at least about 85% by weight, at least 90% by weight, and/or at least 95% by weight or more of a composition or blend of compositions directly or indirectly obtained from a natural oil. Natural oil, as used herein, includes but is not limited to vegetable oils, animal fats, algae oils tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, carnellina oil, and castor oil. Representative non-limiting examples of animal fats include lard, tallow, poultry fat, yellow grease, and fish oil, as well as polyols made from the bio-based diols 1,3-propanediol (PDO) and 1,4-butanediol (BDO) and diacids, including succinic acid and larger acids such as Elevance's Inherent C18 octadecanedioic acid (ODDA). Representative non-limiting examples of algae oils include microalgae, such as Nannochloropsis, Spirulina, Chlorella; algae, such as red algae-Rhodophyta, red algae, Pithophora oedegonia, green algae, among others, and combinations thereof.

As used herein, carbon dioxide-based polyols are poly (ether carbonate) polyols (hereafter "$CO_2$-polyol").

Blowing agents assist in preparing foam, and water is highly desirable as a blowing agent. Other blowing agents suitable according to the present disclosure include fluorocarbons, hydrochlorocarbons, chorofluorocarbons, hydrofluorocarbons, hydrocarbons. It is also contemplated that gas may be added directly to the polyol isocyanate reaction mixture to form the foam.

Surfactants are useful for cell nucleation and cell opening in foam applications and offer foam stabilization.

Cross-linking agents may be used to improve the cross-linked network, control flexural and other properties of the foam. Suitable cross-linking agents include diethanolamine (DEA) and triethanolamine, which, when used in foam applications, build firmness and increase catalytic activity.

Catalysts enhance the processing characteristics and physical properties of polyurethane foams by promoting the basic chemical reactions between polyol and isocyanate, reactions between water and isocyanate, and reactions to trimerizate isocyanates. Catalysts may be selected according to the needs of a particular application, for example, to improve the polyether foaming process of a wide variety of foams, including high-density unfilled foam, filled foam, high load-bearing flexible foam, low-density foam, and high resilience molded foam. Other catalysts may be selected to delay the foam-forming reaction process, which can result in more open foam structures. Suitable catalysts according to the present disclosure are dibutyltin dilaurate (DBTDL) and diluted amine ethers. Tertiary amines may be desirable as catalysts when water is present in the polyol isocyanate reaction mixture, as it catalyzes the isocyanate to react with water to form urea linkages with urethane. According to a form, the catalyst may comprise a first catalyst comprised of a diluted amine ether, and a second catalyst comprised of a water-soluble tertiary amine.

Cell openers may be used to prepare foam structures that have predominantly open cells, which gives it a larger value of air permeability and include water-soluble emulsifiers.

Other optional additives include buffers, dendritic macromolecules, inorganic particulates, other types of polyols not listed herein, polyisocyanates, flame retardants, deodorants, colorants, fillers, combinations thereof, and other additives known to those familiar with the technology and as specific application requirements dictate.

TEST DATA

Various polyol-based foam compositions having differing concentrations of graphite from spent lithium-ion batteries were prepared and tested according to the teachings of the present disclosure. Such graphite has purities of greater than or equal to about 80%, according to some variations, and in others, greater than or equal to about 85%, greater than or equal to about 95%, and greater than or equal to about 99%. Control polyol-based foams having no graphite were also prepared and tested.

The working examples were produced according to the following procedure. First, a polyol mixture was formed by mixing together up to about 100 wt. % of a polyol-containing composition, cell opener, surfactant, cross-linking agent, a catalyst, and graphite recovered from spent lithium-ion batteries at 0.025 wt. %, 0.25 wt. %, and 0.5 wt. % were added and mixed with a handheld mixer at 1500 rpm for about five minutes. Control polyol-based foams were prepared without graphite. An isocyanate was added to the polyol mixture and mixed with the mixer for about 12 seconds. The reaction mixture was poured into a closed mold system that had been coated with a release agent and warmed in a pre-heated oven at about 65° C. for about 15 minutes. Each foam was able to rise within the mold and demolding time was about 6 minutes and upon release from the mold, was crushed by hand to release trapped gases. Each foam was placed in a pre-heated oven at about 65° C. for about 30 minutes and subsequently removed from the oven and then at room temperature for a minimum of about 12 hours to allow for curing.

The resultant foams of the working examples had their tensile strength, tensile modulus, tear resistance, extension at max load, compressive modulus, compressive stress, apparent density, wet compression, and NVH properties tested. At least three samples were measured for each test and the results were averaged.

Referring to FIGS. 2A-2D, various mechanical properties, such as tensile strength, tensile modulus, extension at max load, and tear resistance are shown. As shown in FIGS. 2A and 2B, foam samples prepared with graphite recovered from spent lithium-ion batteries exhibited superior tensile strength and tensile modulus properties in comparison to foams prepared without graphite. More specifically, control foams exhibited tensile strengths on the order of about 85 kPa and less than 90 kPa, whereas foams prepared with graphite recovered from spent lithium-ion batteries exhibited tensile strengths greater than about 90 kPa and on the order of at least about 100 kPa and in some variations on the order of about 120 kPa. Similarly, control foams exhibited lower tensile modulus values than those prepared with graphite recovered from spent lithium-ion batteries. More specifically, control foams exhibited tensile moduli on the order of less than 0.15 MPa, whereas foams prepared with graphite recovered from spent lithium-ion batteries exhibited tensile moduli greater than about 0.15 MPa and on the order of at least about 0.2 MPa. Referring to FIG. 2C, no significant change of extension at max load was uncovered with addition of graphite recovered from spent lithium-ion batteries. And referring to FIG. 2D, tear resistance did not significantly change with foams prepared having 0.025 wt. % and 0.5 wt. % graphite recovered from spent lithium-ion batteries, but there was a decrease in tear resistance for foams prepared having 0.25 wt. % graphite recovered from spent lithium-ion batteries.

Referring to FIGS. 3A-3D, various mechanical properties, such as compressive modulus and compressive stress at strains of 25%, 50%, and 65% are shown. As can be seen, foam samples prepared with graphite recovered from spent lithium-ion batteries exhibited superior compressive modulus and compressive stress at strains in comparison to control foams.

Figures 4, 5:
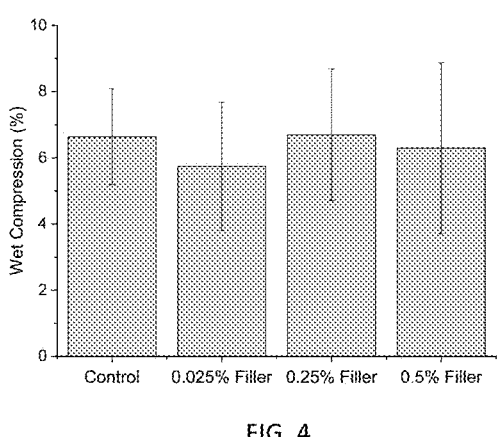
FIG. 4 is a graph showing the wet compression in percent compression of conventional polyurethane foams and polyurethane foams according to the present disclosure.
FIG. 5 is a graph showing the density in $kg/m^3$ of conventional polyurethane foams and polyurethane foams according to the present disclosure.

Referring now to FIG. 4, wet compression percentages show that foam samples prepared with graphite recovered from spent lithium-ion batteries exhibit similar wet compression percentages as control foams. Lower compression set values are consistent with foams that better maintain their initial shape after deforming due to compression and accordingly are highly relevant in the context of interior and seating automobile applications.

And referring to FIG. 5, the densities of foam samples prepared with graphite recovered from spent lithium-ion batteries are similar to control foams. It is desirable for foams to exhibit superior properties, whereas a countervailing desire is to minimize densities of foams.

Figure 6:
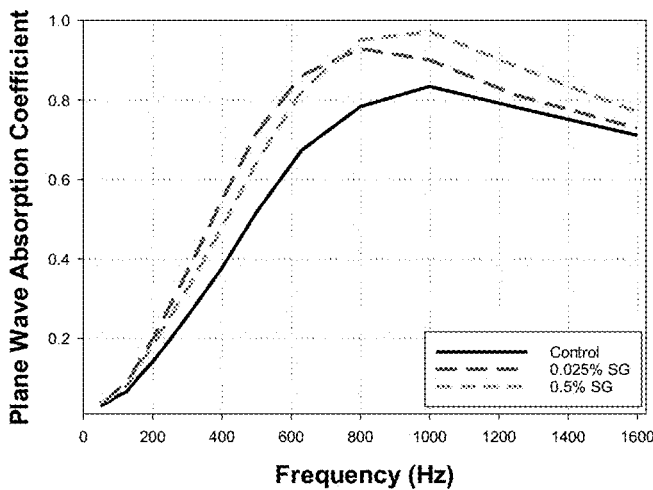
FIG. 6 is a graph showing the NVH properties of conventional polyurethane foams against the NVH properties of polyurethane foams according to the present disclosure.

Turning now to FIG. 6, foam samples of graphite recovered from spent lithium-ion batteries at 0.025 wt. % and 0.5 wt. % exhibited superior NVH properties compared with control foam samples, as can be seen from the superior sound absorption coefficient exhibited by such foams. Such foams, as noted above, have similar densities to that of the control foam samples, so they have superior NVH properties without a corresponding undesirable increase in foam density. Foams produced according to the present disclosure exhibited superior NVH properties virtually across the sound frequency spectrum as compared to control foams. By way of not limiting example, such foams have a plane wave absorption coefficient of greater than or equal to about 0.75 at 600 Hz.

The foams disclosed herein exhibit superior mechanical properties and accordingly are highly relevant in the context of various applications, including for use in the automotive industry and further including, by way of example, the furniture industry and the marine transportation industry. Further, the foams disclosed herein may be used in various automotive applications and for vehicle components, including but not limited to seat backs, arm rests, seat cushions, headliner applications, head rests, and NVH foams, engine covers, oil pump covers, air conditioning compression covers, fuel covers, and under the hood covers, among others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A foam material comprising the reaction product of a polyol mixture and an isocyanate mixture, and a graphite recovered from a lithium-ion battery, wherein the graphite defines a layered structure and adhesion anchor points.

2. The foam material according to claim 1, wherein the foam comprises graphite at greater than or equal to about 0.025 wt. % to less than or equal to about 0.5 wt. %.

3. The foam material according to claim 1, wherein the graphite has a purity greater than or equal to about 80%.

4. The foam material according to claim 1, wherein the graphite has a purity of greater than or equal to about 95%.

5. The foam material according to claim 1, wherein the graphite includes oxygen-containing groups in the form of defects.

6. A part comprising the foam material according to claim 1.

7. A foam material comprising the reaction product of a polyol mixture and an isocyanate mixture, and a graphite filler in an amount of greater than or equal to about 0.025 wt. % and less than or equal to about 0.5 wt. %, wherein the graphite is recovered from a lithium-ion battery.

8. The foam material according to claim 7, wherein the graphite filler defines a layered structure and adhesion anchor points.

9. The foam material according to claim 7, wherein the graphite filler has a purity greater than or equal to about 80%.

10. The foam material according to claim 7, wherein the graphite filler has a purity of greater than or equal to about 95%.

11. The foam material according to claim 7, wherein the graphite filler includes oxygen-containing groups in the form of defects.

12. The foam material according to claim 7, wherein the foam material has a tensile strength of greater than or equal to about 90 kPa.

13. The foam material according to claim 7, wherein the foam material has a tensile modulus of greater than or equal to about 0.15 MPa.

14. A foam material comprising the reaction product of a polyol mixture and an isocyanate mixture, and a graphite filler in an amount of greater than or equal to about 0.025 wt. % and less than or equal to about 0.5 wt. %, wherein the graphite filler defines a layered structure and adhesion anchor points.

15. The foam material according to claim 14, wherein the graphite filler has a purity greater than or equal to about 80%.

16. The foam material according to claim 14, wherein the graphite filler a purity of greater than or equal to about 95%.

17. The foam material according to claim 14, wherein the graphite filler includes oxygen-containing groups in the form of defects.

18. The foam material according to claim 14, wherein the foam material has a tensile strength of greater than or equal to about 90 kPa.

19. The foam material according to claim 14, wherein the foam material has a tensile modulus of greater than or equal to about 0.15 MPa.

20. A part comprising the foam material according to claim 14.

* * * * *